US009596639B2

(12) United States Patent
Bengtsson et al.

(10) Patent No.: US 9,596,639 B2
(45) Date of Patent: Mar. 14, 2017

(54) USER DEVICE SMART CELL SELECTION

(71) Applicant: Sony Corporation, Tokyo (JP)

(72) Inventors: Erik Bengtsson, Lund (SE); Vanja Plicanic Samuelsson, Lund (SE); Zhinong Ying, Lund (SE); Rickard Ljung, Lund (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 212 days.

(21) Appl. No.: 14/515,912

(22) Filed: Oct. 16, 2014

(65) Prior Publication Data
US 2015/0141020 A1 May 21, 2015

Related U.S. Application Data

(60) Provisional application No. 61/906,743, filed on Nov. 20, 2013.

(51) Int. Cl.
*H04W 36/32* (2009.01)
*H04W 36/16* (2009.01)
*H04W 4/02* (2009.01)
*H04W 48/20* (2009.01)
H04W 36/24 (2009.01)

(52) U.S. Cl.
CPC ........... *H04W 36/32* (2013.01); *H04W 4/027* (2013.01); *H04W 36/165* (2013.01); *H04W 48/20* (2013.01); *H04W 36/245* (2013.01)

(58) Field of Classification Search
CPC ..... H04W 48/17; H04W 48/18; H04W 48/20; H04W 88/08; H04W 36/245; H04W 36/32; H04W 36/165; H04W 4/027
See application file for complete search history.

(56) References Cited

U.S. PATENT DOCUMENTS

2002/0187792 A1  12/2002  Kato et al.
2011/0250891 A1  10/2011  Zou et al.
(Continued)

FOREIGN PATENT DOCUMENTS

EP       2169938 A2    3/2010

OTHER PUBLICATIONS

International Search Report and Written Opinion; Feb. 4, 2015; issued in International Patent Application No. PCT/EP2014/072427.

*Primary Examiner* — Curtis Odom
(74) *Attorney, Agent, or Firm* — Moore & Van Allen PLLC; James C. Edwards

(57) ABSTRACT

Embodiments of the invention are directed to systems, methods and computer program products for minimizing data overhead in a cellular network. In one embodiment, a method includes determining, by a mobile device connected to the cellular network via a connection point, that the connection point has limited capacity; determining, by the mobile device, location information including location data indicating a current location of the mobile device; and determining, by the mobile device, an offload alternative connection point based on the determined location of the mobile device. In some cases, the method includes initiating disconnecting of the mobile device from a current connection point; and initiating connecting the mobile device to the offload alternative connection point.

21 Claims, 9 Drawing Sheets

(56) References Cited

U.S. PATENT DOCUMENTS

2012/0122515 A1  5/2012 Han et al.
2013/0023302 A1  1/2013 Sivanesan et al.
2013/0295962 A1* 11/2013 Manroa .................. H04W 4/02
                                                        455/456.3

* cited by examiner

```
┌─────────────────────────────────────────────────────────────┐
│   DETERMINING, BY THE BASE STATION, AN OFFLOAD ALTERNATIVE  │
│  CONNECTION POINT BASED ON THE DETERMINED LOCATION OF THE   │
│                       MOBILE DEVICE                         │
│                            308                              │
│  ┌───────────────────────────────────────────────────────┐  │
│  │    DETERMINING THAT THE MOBILE DEVICE HAS ENTERED AN  │  │
│  │     OVERLAP ZONE WHEREBY A FIRST GEOGRAPHIC AREA      │  │
│  │  ASSOCIATED WITH A CURRENT CONNECTION POINT OVERLAPS  │  │
│  │     A SECOND GEOGRAPHIC AREA ASSOCIATED WITH THE      │  │
│  │         OFFLOAD ALTERNATIVE CONNECTION POINT          │  │
│  │                          402                          │  │
│  └───────────────────────────────────────────────────────┘  │
│                                                             │
│  ┌───────────────────────────────────────────────────────┐  │
│  │  PREDICTING, BASED ON THE LOCATION, CURRENT SPEED AND │  │
│  │    CURRENT DIRECTION OF MOVEMENT, THAT THE MOBILE     │  │
│  │   DEVICE WILL ENTER A GEOGRAPHIC AREA ASSOCIATED WITH │  │
│  │    THE OFFLOAD ALTERNATIVE CONNECTION POINT WITHIN A  │  │
│  │               PREDETERMINED PERIOD OF TIME            │  │
│  │                          404                          │  │
│  └───────────────────────────────────────────────────────┘  │
│                                                             │
│  ┌───────────────────────────────────────────────────────┐  │
│  │  PREDICTING, BASED ON THE LOCATION, CURRENT SPEED AND │  │
│  │    CURRENT DIRECTION OF MOVEMENT, THAT THE MOBILE     │  │
│  │    DEVICE WILL REMAIN IN A GEOGRAPHIC AREA ASSOCIATED │  │
│  │  WITH THE OFFLOAD ALTERNATIVE CONNECTION POINT FOR A  │  │
│  │               PREDETERMINED PERIOD OF TIME            │  │
│  │                          406                          │  │
│  └───────────────────────────────────────────────────────┘  │
└─────────────────────────────────────────────────────────────┘
```

Figure 4

DETERMINING, BY THE BASE STATION, AN OFFLOAD ALTERNATIVE CONNECTION POINT BASED ON THE DETERMINED LOCATION OF THE MOBILE DEVICE
308

BUILDING, BASED AT LEAST IN PART ON HISTORICAL DATA CORRESPONDING TO GEOGRAPHIC AREAS ASSOCIATED WITH CONNECTION POINTS AND DATA OVERHEAD ASSOCIATED WITH THE CONNECTION POINTS, A CONNECTION POINT MAP INCLUDING A PLURALITY OF GEOGRAPHIC AREAS EACH ASSOCIATED WITH AT LEAST ONE NETWORK BASE STATION OR AT LEAST ONE ACCESS POINT
602

ACCESSING A CONNECTION POINT MAP INCLUDING A PLURALITY OF GEOGRAPHIC AREAS EACH ASSOCIATED WITH AT LEAST ONE NETWORK BASE STATION OR AT LEAST ONE ACCESS POINT
604

DETERMINING, BASED ON THE PLURALITY OF GEOGRAPHIC AREAS OF THE CONNECTION POINT MAP, THE OFFLOAD ALTERNATIVE CONNECTION POINT
606

Figure 6

USER DEVICE SMART CELL SELECTION

BACKGROUND

In modern cellular networks, a significant amount of traffic or data overhead originates from offload or handover from one connection point such as a network base station or wireless access point such as a WIFI hotspot to another connection point. In addition to the increase in network traffic and overhead, a handover from one connection point to another may risk the connection being interrupted and/or lost.

These problems may be reduced or avoided if the user equipment (UE) such as a user mobile device remains continuously connected to an optimal network cell or connection point during a data transfer session. Unfortunately, in current configurations, UEs must continuously scan their environment for better connection points during a session when the connection quality is low.

BRIEF SUMMARY

Embodiments of the invention are directed to systems, methods and computer program products for minimizing control signaling load by reducing probability for handovers in a cellular network. The method includes determining, by a mobile device, that a data traffic session over the cellular network will be initiated by the mobile device within a predetermined period of time; determining, by the mobile device, that the mobile device is in an idle mode with the cellular network, in response to determining that the data traffic session will be initiated and the mobile device is in the idle mode, determining, by the mobile device, location information including location data indicating a current location of the mobile device; and determining, by the mobile device, at least one potential connection point based at least in part on the determined location of the mobile device.

In some embodiments, determining the potential connection point comprises accessing a connection point map including a plurality of geographic areas each associated with at least one network base station or at least one access point; and determining, based on the plurality of geographic areas of the connection point map, the at least one potential connection point.

In some embodiments, the location information comprises a velocity vector comprising current location data indicating the location of the mobile device, speed data current direction of movement of the mobile device; and determining at least one potential connection point comprises determining based on the current location data, the current speed and the current direction of movement of the mobile device. In some such embodiments, determining the potential connection point comprises accessing a connection point map including a plurality of geographic areas each associated with at least one network base station or at least one access point; and determining, based on the velocity vector of the mobile device and the plurality of geographic areas, which of the at least one network base stations or at least one access points, if connected to the mobile device, would minimize a handover probability for the session to be initiated, thereby indicating the at least one potential connection point. In some of these embodiments, the method includes monitoring, using the mobile device, a network base station signal level; determining, using the mobile device, that the network base station signal level has fallen below a signal level predetermined threshold; and listening, using the mobile device, for any alternative connection points within range of the mobile device.

In some of these embodiments, recognizing at least one alternative connection point within range of the mobile device; accessing the connection point map to determine geographic areas associated with the at least one alternative connection point; and determining, based on the velocity vector of the mobile device, the potential connection point from the at least one alternative connection point. In some such embodiments, determining the potential connection point further comprises determining that the mobile device has a current speed greater than a predetermined speed threshold; in response to determining the current speed is greater than the predetermined speed threshold and in response to determining that the network base station signal level is lower than the signal level predetermined threshold, determining that a geographic area associated with one of the alternative connection points is less than a minimum predetermined geographic area threshold; and eliminating the alternative connection point from consideration as the potential connection point.

In other such embodiments, determining the potential connection point further comprises determining that the mobile device has a current speed greater than a predetermined speed threshold; in response to determining the current speed is greater than the predetermined speed threshold and in response to determining that the network base station signal level is lower than the signal level predetermined threshold, determining a projected path of travel of the mobile device based on the velocity vector; determining, using the mobile device, that one of the alternative connection points has a projected geographic area of relevance, based on the projected path of travel, that is less than a minimum predetermined threshold; and eliminating the alternative connection point from consideration as the potential connection point.

In yet other such embodiments, determining the potential connection point further comprises determining that the mobile device has a current speed greater than a predetermined speed threshold; in response to determining the current speed is greater than the predetermined speed threshold and in response to determining that the network base station signal level is lower than the signal level predetermined threshold, determining a projected path of travel of the mobile device based on the velocity vector; determining, based on the projected path of travel, that the mobile device is exiting the geographic area associated with the alternative connection point; and eliminating the alternative connection point from consideration as the potential connection point.

In some embodiments, the method includes initiating connecting the mobile device to the potential connection point.

In some embodiments, the method includes building, based at least in part on historical data gathered by the mobile device and corresponding to geographic areas associated with connection points and data overhead associated with the connection points, a connection point map including a plurality of geographic areas each associated with at least one network base station or at least one access point, including velocity information comprising speed and direction information associated with at least one network base station or at least one access point, the velocity information indicating that the associated at least one network base station or at least one access point should be considered as potential connection points for mobile devices having specified speeds and directions.

In some such embodiments, the method also includes receiving and storing user input indicating a user negative preference selecting at least one of the connection points, the user negative preference indicating that the mobile device should not connect with the at least one selected connection point regardless of a size of its associated geographic area in the event the mobile device has a velocity vector falling within predetermined negative velocity parameters; a user positive preference selecting at least one of the connection points, the user positive preference indicating that the mobile device should consider as the potential connection point the selected at least one connection point regardless of a size of its associated geographic area in the event the mobile has a velocity vector falling within predetermined positive velocity parameters.

According to embodiments of the invention, a mobile device includes a memory; a processor; and a module stored in the memory for minimizing control signaling load by reducing probability for handovers in a cellular network, executable by the processor, and configured to access a connection point map including a plurality of geographic areas each associated with at least one network base station or at least one access point; and determine, based on the plurality of geographic areas of the connection point map, the potential connection point.

In some embodiments, the location information comprises a velocity vector comprising current location data indicating the location of the mobile device, speed data indicating a current speed of the mobile device and movement direction data indicating a current direction of movement of the mobile device; and determining a potential connection point comprises determining based on the current location data, the current speed and the current direction of movement of the mobile device. In some of these embodiments, determining the potential connection point comprises accessing a connection point map including a plurality of geographic areas each associated with at least one network base station or at least one access point; and determining, based on the velocity vector of the mobile device and the plurality of geographic areas, which of the at least one network base stations or at least one access points, if connected to the mobile device, would minimize a handover probability for the session to be initiated, thereby indicating the potential connection point.

In some embodiments, the module is further to monitor a network base station signal level; determine that the network base station signal level has fallen below a signal level predetermined threshold; and listen for any alternative connection points within range of the mobile device. In some such embodiments, the module is further to recognize at least one alternative connection point within range of the mobile device; access the connection point map to determine geographic areas associated with the at least one alternative connection point; an determine, based on the velocity vector of the mobile device, the potential connection point from the at least one alternative connection point. In some embodiments, the module is further to initiate connecting the mobile device to the potential connection point.

In some embodiments, the module is further to build, based at least in part on historical data gathered by the mobile device and corresponding to geographic areas associated with connection points and data overhead associated with the connection points, a connection point map including a plurality of geographic areas each associated with at least one network base station or at least one access point.

According to embodiments of the invention, a computer program product for minimizing control signaling load by reducing probability for handovers in a cellular network includes a non-transitory computer-readable medium comprising a set of codes for causing a computer to determine that a data traffic session over the cellular network will be initiated by the mobile device within a predetermined period of time; determine that the mobile device is in an idle mode with the cellular network, in response to determining that the data traffic session will be initiated and the mobile device is in the idle mode, determine location information including location data indicating a current location of the mobile device; and determine a potential connection point based at least in part on the determined location of the mobile device.

BRIEF DESCRIPTION OF THE DRAWINGS

Figure 1:
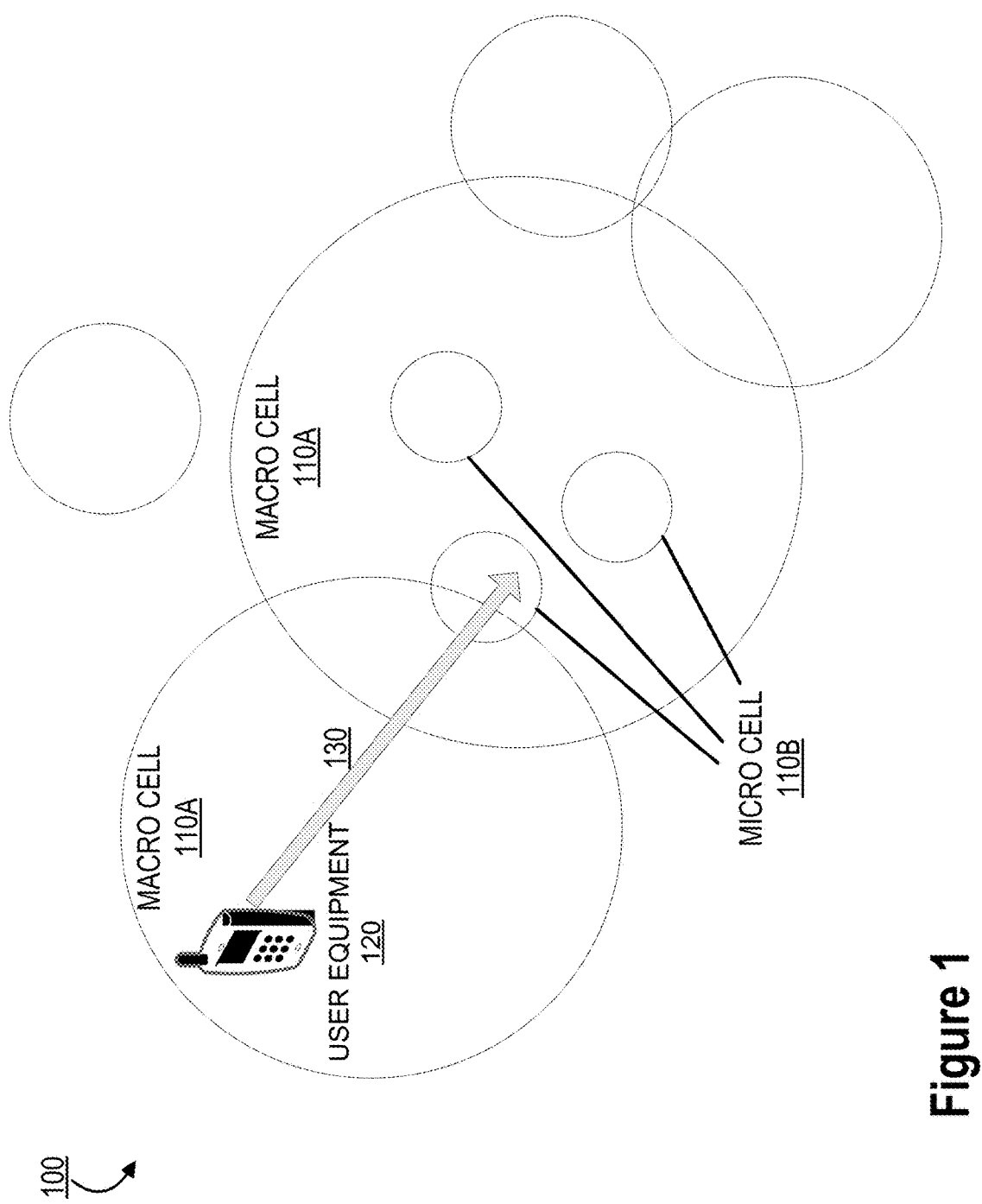
Figure 2:
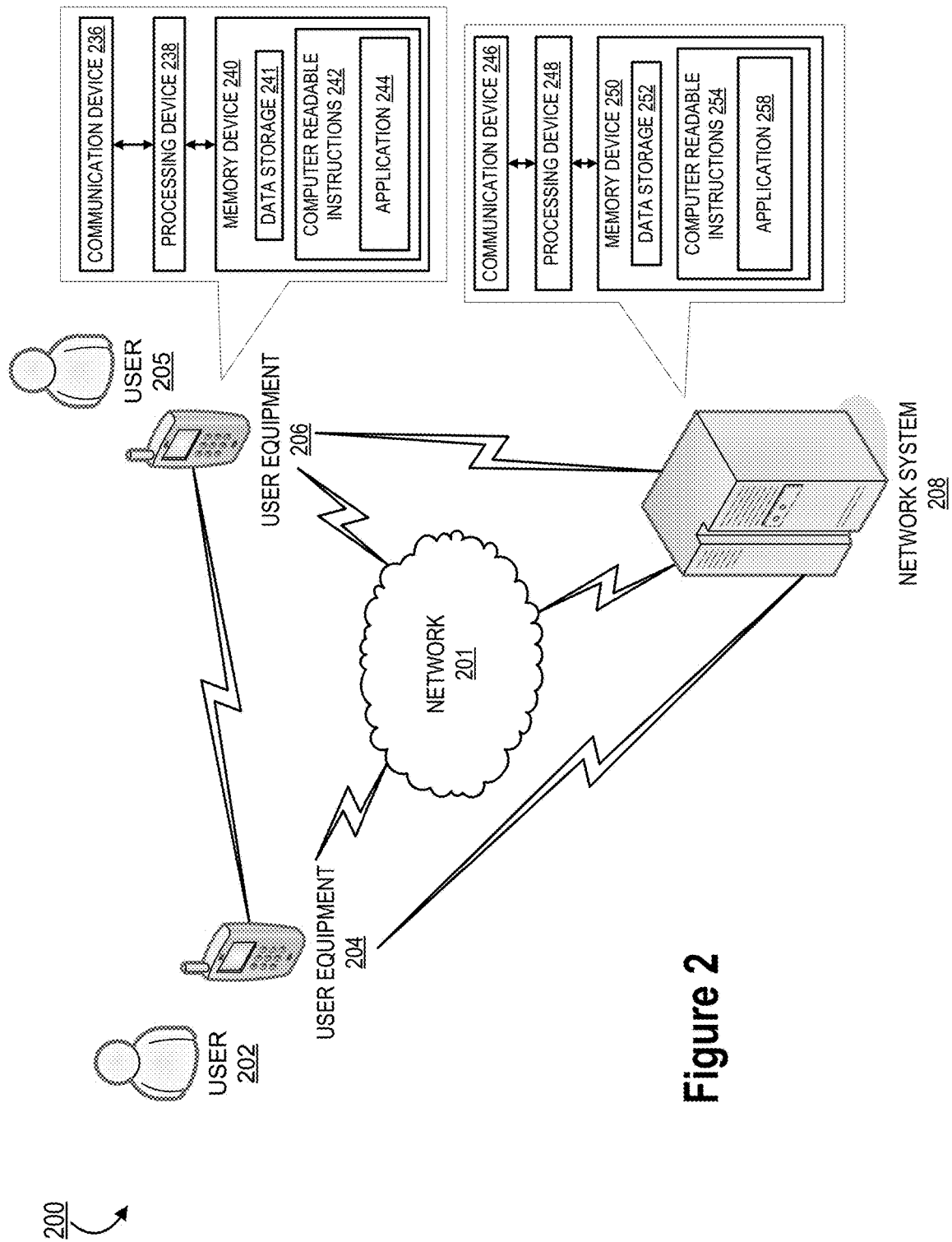
Figure 3:
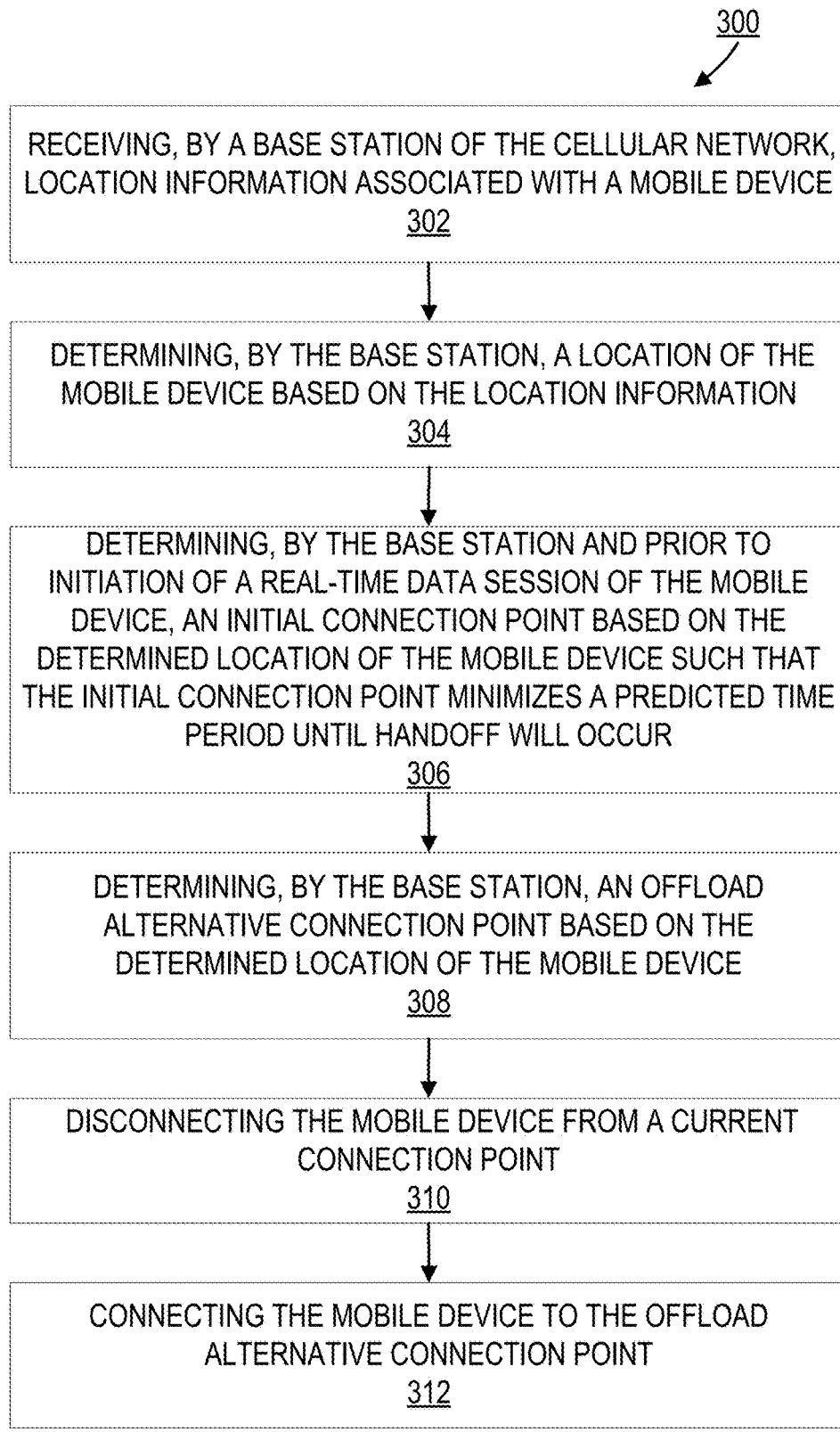
Figure 5:
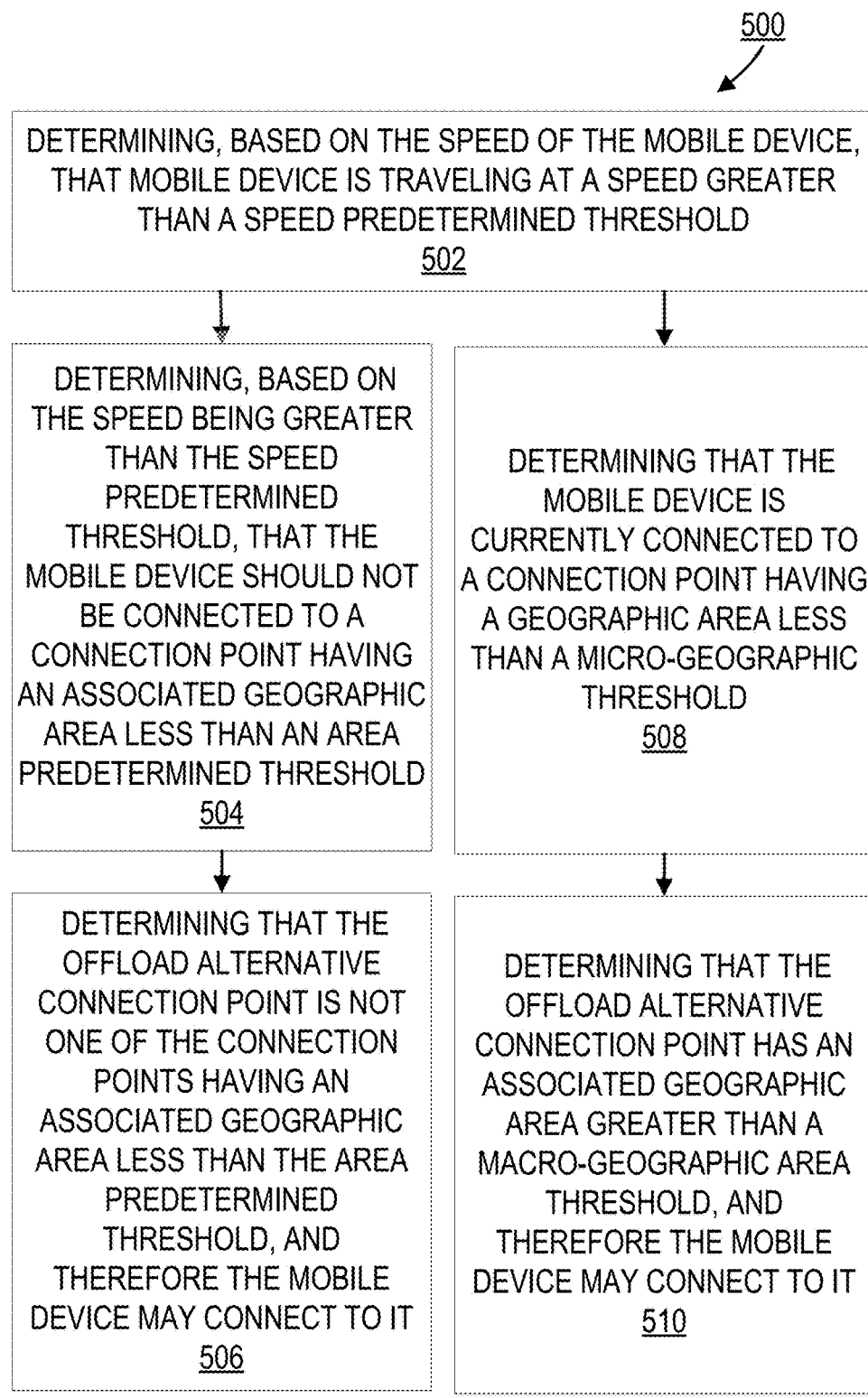
Figure 7:
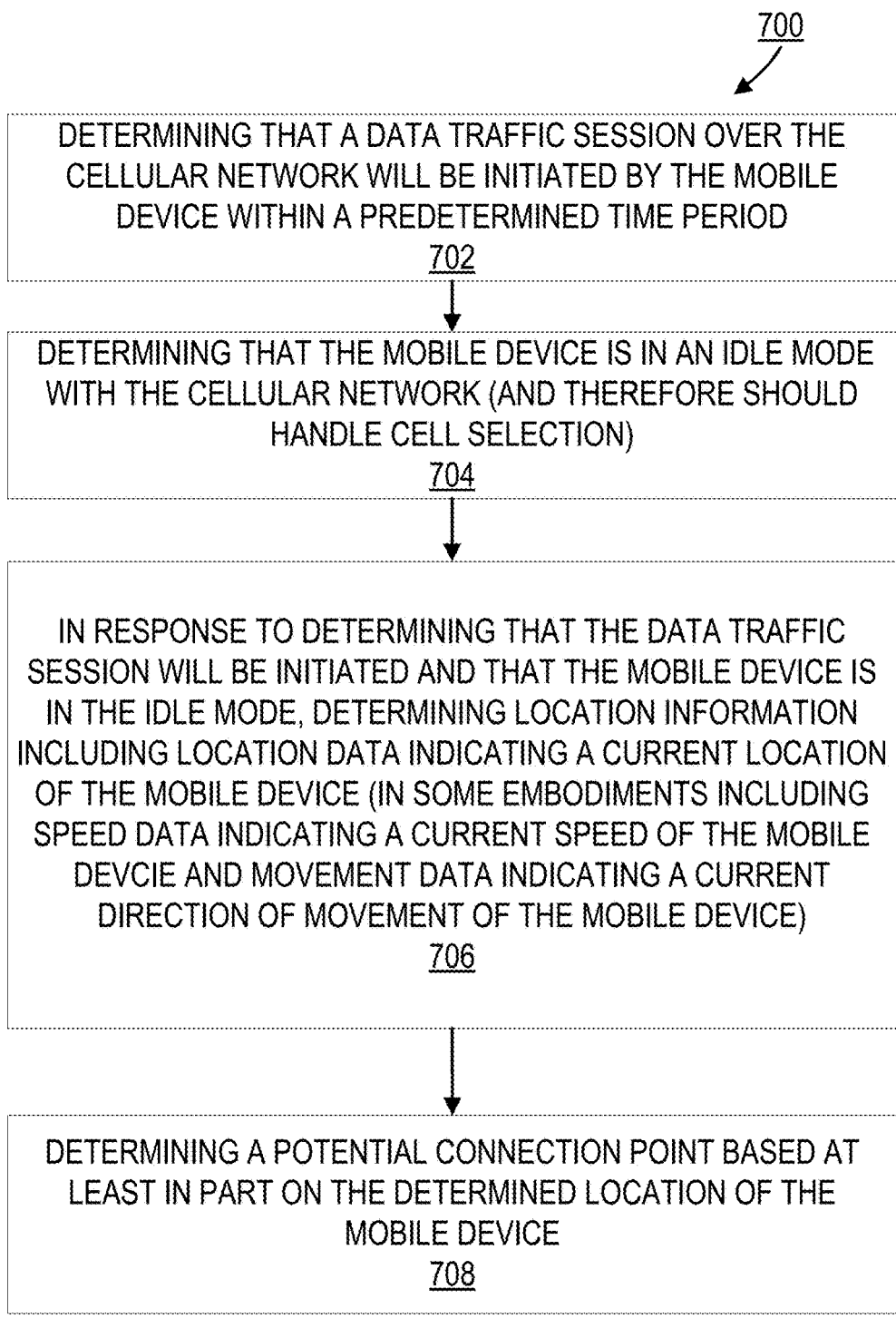
Figure 8A:
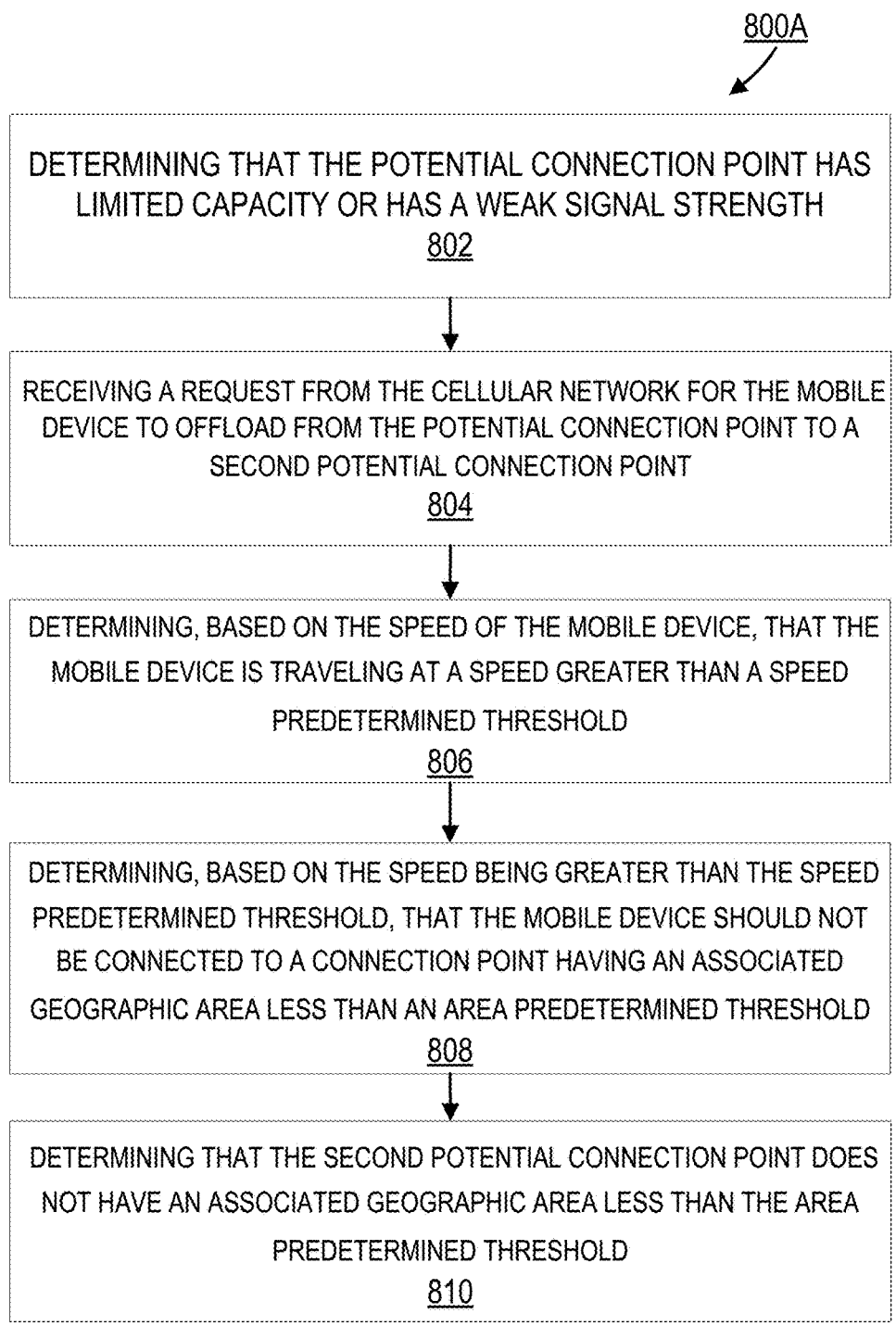
Figure 8B:
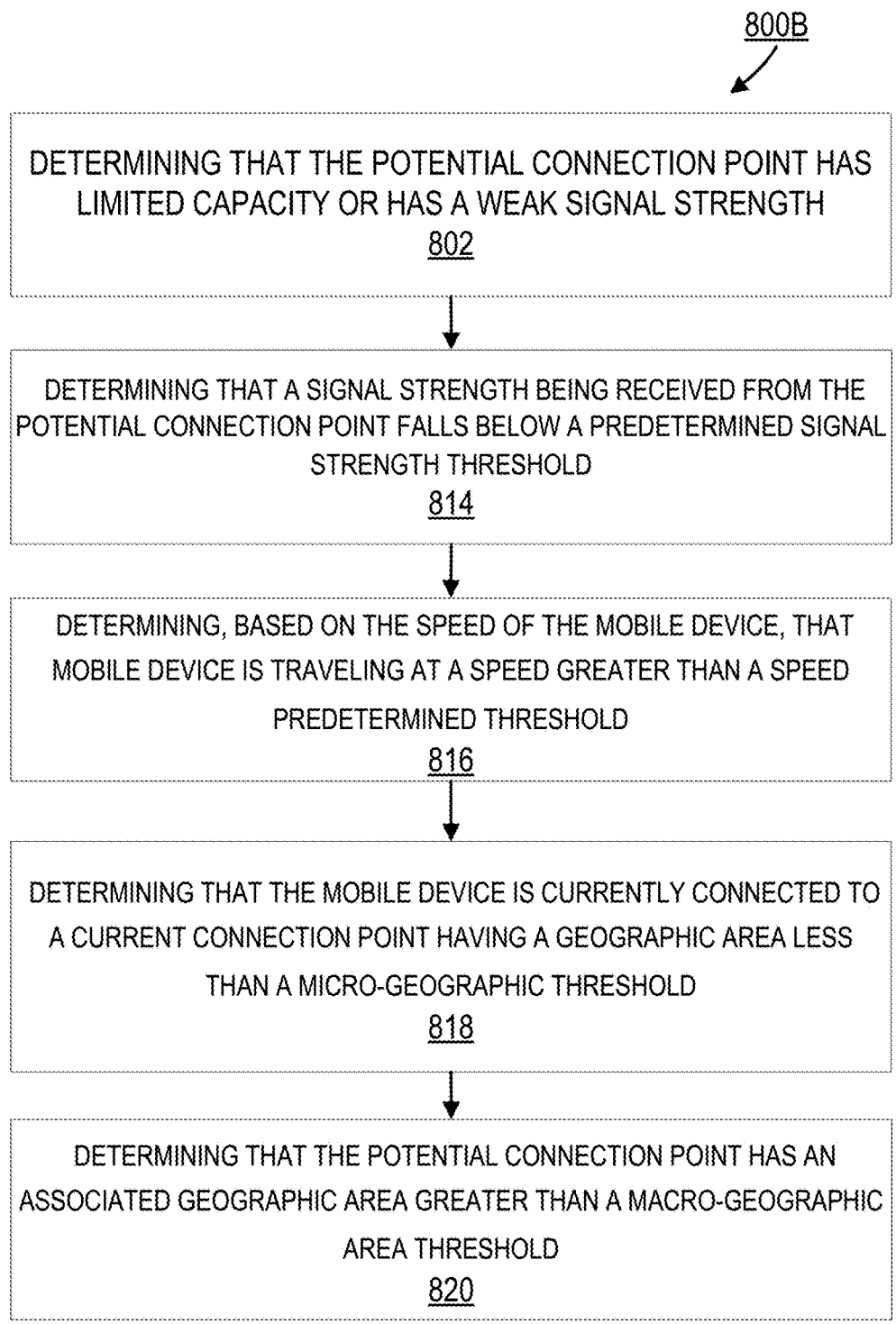

Having thus described embodiments of the invention in general terms, reference will now be made to the accompanying drawings, where:

FIG. 1 illustrates a cellular network environment 100 in which user equipment operates according to embodiments of the invention;

FIG. 2 illustrates an environment 200 wherein user equipment devices and network systems operate according to embodiments of the invention;

FIG. 3 is a flowchart illustrating a method 300 for minimizing data overhead in a cellular network;

FIG. 4 illustrates a diagram including optional sub-steps for determining an offload alternative connection point according to embodiments of the invention;

FIG. 5 is a flowchart illustrating a method 500 for minimizing data overhead in a cellular network according to embodiments of the invention;

FIG. 6 illustrates a diagram including optional sub-steps for determining an offload alternative connection point according to embodiments of the invention;

FIG. 7 is a flowchart illustrating a method 700 for minimizing control signaling load by reducing probability for handovers in a cellular network according to embodiments of the invention; and FIGS. 8A and 8B are flowcharts illustrating methods 800A and 800B, respectively, that include optional steps for minimizing control signaling load by reducing probability for handovers in a cellular network according to embodiments of the invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Embodiments of the invention enable a cellular network to determine the position and direction of user equipment (UE) such as a user mobile device and conduct a smart UE handover or offload from a first connection point (CP) such as a network base station or wireless access point (e.g., WIFI or otherwise) to an appropriate second CP.

In prior systems, the CP and/or UE relied solely on adaptive algorithms to sense network conditions, thereby triggering a search for an alternate CP. Some embodiments of the invention provide a connection point map that includes the geographic areas corresponding to CPs, which represent each CP's signal strength. In some cases a CP is considered a "macro cell" or a "micro cell" depending on the geographic area corresponding to the CP (or in other words, depending on the signal strength of the CP or cell). The CP map, in various embodiments, is built based on historical data gathered by one or more mobile devices and/or one or more base stations and/or adaptive and/or smart algorithms. The historical data may include or be data related to the geographic areas that correspond to particular CPs (e.g., data indicating a geographic location where a mobile device successfully connected with a specific CP, possibly including detailed information such as the signal strength or other information). The historical data may also be or include information regarding data used during session connections, disconnections, re-connections or other usage and may indicate an amount of data overhead and possible waste involved in connection activity in specific locations.

In some cases, the geographic areas corresponding to CPs overlap, and the system (i.e., the base station and/or the mobile device) must determine whether to maintain the current CP or switch the connection to another CP. In various embodiments, the determination is based on whether the current connection is with a macro cell or a micro cell.

Accordingly, in some embodiments, the base station and/or mobile device may receive and/or determine, respectively, location information associated with a mobile device. The location information may include current location data indicating the location of the mobile device, speed data indicating a current speed of the mobile device and movement direction data indicating a current direction of movement of the mobile device. The method may include determining, by the base station, a location of the mobile device based on the location information; and determining, by the base station, an offload alternative connection point based on the determined location of the mobile device. In some cases, the method includes disconnecting the mobile device from a current connection point; and connecting the mobile device to the offload alternative connection point.

In some cases, determining the offload alternative connection point includes determining that the mobile device has entered an overlap zone whereby a first geographic area associated with a current connection point overlaps a second geographic area associated with the offload alternative connection point.

In some cases, determining the offload alternative connection point includes predicting, based on the location, current speed and current direction of movement, that the mobile device will enter a geographic area associated with the offload alternative connection point within a predetermined period of time, and in other embodiments, it includes predicting, based on the location, current speed and current direction of movement, that the mobile device will remain in a geographic area associated with the offload alternative connection point for a predetermined period of time.

In order to keep network traffic low, the mobile device may only communicate its location upon request and/or whenever large amounts of data must be transferred. Some benefits of the invention include that connection to smaller cells or hotspots may be avoided if the UE moves with a high speed. Further, when a UE is connected to a sub-cell or micro cell while it is moving, the network and/or the UE may handover the connection to a macro cell prior to initiating a communication session as a matter of course.

In summary, a UE is in idle mode and has a velocity vector that includes current location, speed and direction. Based on a historical listing or mapping of connection points, the UE may select a connection point prior to a data session in order to minimize the chances that handover will be necessary. This history list or connection point mapping may be either a global list (supplied by UE users), a private list (accessible only to one or more defined users or one or more defined UEs) or a combination of global/private.

More specifically, in some embodiments, the UE may continuously monitor the signal level of a nearby base station, and if the base station signal level becomes weak (e.g., drops below a threshold for a certain period of time), then the UE will listen for alternative connection points. Generally, as long as the UE is in the same base station cluster, the UE need not report to the base station. Once a data session is initiated, the UE can connect to any base station within its range, and so the UE has an opportunity to select which base station with which to connect. This determination may be made based on the history map (i.e., connection point map) and a determination of which alternative connection points have a signal level or geographic area greater than a threshold. This determination may also take into account the velocity vector of the UE. For example, the UE may avoid "smaller" cells when it is moving in order to reduce handover signaling.

Additionally, a UE may learn to avoid certain cells (i.e., connection points) along a route where the UE typically travels. This may be due to poor connection quality, necessity for quickly handing over to another cell soon after connection or the like. In some embodiments, the user may enter a preference regarding whether a cell should be considered as a potential connection point or not. In some cases, the user and/or the mobile device defines other criteria for placing a connection point on a "do not connect" or a "do consider connecting" list. Such other criteria may include velocity information, such as, a mobile device traveling within a range of velocity vectors should or should not consider connecting to the specific connection point. As another example, a user may prefer the mobile device not to connect to any "small" cells, but may exclude a user-owned WIFI access point or an approved access point in a train or car that the user often utilizes.

In other embodiments, the network (i.e., base stations and the like) control connection point selection rather than the UE (mobile device). When a UE is idle, the base station typically does not know the location of the UE as long as the UE remains in the same cluster. When the UE moves into a new cluster, it typically reports to the base station that it is moving into a new cluster. Some embodiments of the invention provide that, prior to a data session or call, the UE reports its velocity vector (current location, speed and direction) to the base station. Then, the base station is able to, if it is characterized as a "small" cell in relation to the velocity vector of the UE, the base station can handover the connection to a larger cell. On the other hand, if the base station is a "large" cell, then it can go ahead and connect with the UE and conduct the call or data session.

When a UE already has a connection with the base station, the base station may determine that the signal strength from the UE is weak (or in need of more capacity than the base station can handle). The base station may then request the UE to identify any alternative cell or connection points. The base station may then request the UE to report its velocity vector (current location, speed and direction). The base station may then identify the best alternative connection point for handover based on the UE's velocity vector in relation to the connection point list (map). The list or map can be preprogrammed, learned by the base station and/or one or more UEs or a combination as discussed above.

In various embodiments where the UE is in control of cell selection as well as embodiments where the network is in control of cell selection, the invention may include determining that the signal strength (of the UE and/or the potential/current connection point) is low, and therefore, it is time to consider an alternative connection point. When the UE is moving at a speed greater than a threshold, and in some cases, in a predetermined direction and/or location, the cell selection may involve various processes. For example, in some embodiments, the cell selection may avoid any or some (based on user/network preferences) small cells. In other embodiments, the cell selection may avoid connecting to a cell that has a small coverage area along the UE's predicted path, regardless of whether the cell is a "large" cell. Finally, in other embodiments, the cell selection may avoid connecting to a cell (or remaining connected to a cell) if the UE is traveling out of the cell.

Referring now to FIG. 1, a cellular network environment 100 in which user equipment 120 operates according to embodiments of the invention is illustrated. As shown, the cellular network environment 100 includes various cells or geographic areas that correspond to the signal reach and/or strength of various connection points. A macro cell is generally considered to be a cell or CP that has a geographic area greater than a predetermined macro-threshold, and a micro cell is generally considered to be a cell or CP that has a geographic area less than a predetermined micro-threshold.

As shown, there may be many different types of cells in a particular environment 100. A mobile device such as UE 120 may encounter these different types of cells, particularly if the mobile device is moving, such as in the direction of arrow 130. UE 120 may be moving, such as by vehicle, through one macro cell 110A toward another macro cell 110A. Likewise, UE 120 may be moving toward one or more micro cells such as micro cells 110B. In some cases, the various cells may overlap. Thus, the UE 120 and/or the cell itself (in the case of a cell being a network base station) may need to determine whether the switch from a current CP to another CP. This determination, as discussed in greater detail below, may be based on the size of the geographic area corresponding to the available CPs and/or the CP(s) that are predicted to become available to the UE 120 based on the UE's direction of travel.

Referring now to FIG. 2, a network environment 200 is illustrated in accordance with one embodiment of the present invention. As illustrated in FIG. 2, the network system 208 is operatively coupled, via a network 201 to the user equipment 204 and/or 206. In this configuration, the network system 208 may send information to and receive information from the user equipment devices 204 and/or 206. The network system 208 may be or include one or more network base stations or other network components. FIG. 2 illustrates only one example of an embodiment of a network environment 200, and it will be appreciated that in other embodiments one or more of the systems, devices, or servers may be combined into a single system, device, or server, or be made up of multiple systems, devices, or servers.

The network 201 may be a global area network (GAN), such as the Internet, a wide area network (WAN), a local area network (LAN), a telecommunication network or any other type of network or combination of networks. The network 201 may provide for wireline, wireless, or a combination wireline and wireless communication between devices on the network 201.

In some embodiments, the users 202 and 205 are individuals who maintain cellular products with one or more providers.

As illustrated in FIG. 2, the network system 208 generally comprises a communication device 246, a processing device 248, and a memory device 250. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 248 is operatively coupled to the communication device 246 and the memory device 250. The processing device 248 uses the communication device 246 to communicate with the network 201 and other devices on the network 201. As such, the communication device 246 generally comprises a modem, server, or other device for communicating with other devices on the network 201.

As further illustrated in FIG. 2, the network system 208 comprises computer-readable instructions 254 stored in the memory device 250, which in one embodiment includes the computer-readable instructions 254 of an application 258. In some embodiments, the memory device 250 includes data storage 252 for storing data related to and/or used by the application 258.

In some embodiments, the application 258 may allow for communications between the UEs 204 and 206 with or without assistance from the network 201. The application 258 may minimize data overhead in the network by performing one or more of the steps and/or sub-steps discussed herein.

As illustrated in FIG. 2, the user equipment 206 generally comprises a communication device 236, a processing device 238, and a memory device 240. The processing device 238 is operatively coupled to the communication device 236 and the memory device 240. In some embodiments, the processing device 238 may send or receive data from the user equipment 204, and/or the network system 208 via the communication device 236 over a network 201. As such, the communication device 236 generally comprises a modem, server, or other device for communicating with other devices on the network 201.

As further illustrated in FIG. 2, the user equipment 206 comprises computer-readable instructions 242 stored in the memory device 240, which in one embodiment includes the computer-readable instructions 242 of an application 244. In the embodiment illustrated in FIG. 2, the application 244 allows the user equipment 206 to be linked to the network system 208 to communicate, via a network 201. The application 244 may also allow the user equipment 206 to connect directly (i.e., locally or device to device) with the user equipment 204 for proximity services (e.g., using either cellular based links or non-cellular based links). The application 244 may minimize data overhead in the network by performing one or more of the steps and/or sub-steps discussed herein. Applications 258 and 244 may work independently of one another or may collaborate in order to minimize data overhead as discussed herein. For example, application 258 may send base station signal strength information to the network and application 244 may receive the information and make a determination whether to handover the UE 206 connection to the network system 208.

It is understood that the servers, systems, and devices described herein illustrate one embodiment of the invention. It is further understood that one or more of the servers, systems, and devices can be combined in other embodiments and still function in the same or similar way as the embodiments described herein.

Referring now to FIG. 3, a flowchart illustrates a method 300 for minimizing data overhead in a cellular network from the perspective of a network base station. While FIG. 3 is illustrated from the perspective of the network base station, it should be noted that one or more or all of the steps discussed with reference to FIG. 3, and with reference to any of the steps and/or sub-steps discussed herein may be performed by a network base station, by a mobile device and/or otherwise. The first step, represented by block 302, is to receive, by a base station of the cellular network, location information associated with a mobile device. The next step, represented by block 304, is to determine a location of the mobile device based on the location information.

Next, in some embodiments, as represented by block 306, the base station determines, prior to initiation of a real-time data session of the mobile device, an initial connection point based on the determined location of the mobile device. This initial connection point may be determined to minimize a predicted time period until a handoff or offload must occur.

The next step, represented by block 308, is to determine an offload (or handoff) alternative connection point based on the determined location of the mobile device. This determination, as discussed in greater detail below, may be based on the location of the mobile device, the speed of travel of the mobile device, the direction of travel of the mobile device, and/or adaptive or smart algorithms.

The next step, represented by block 310, is to disconnect the mobile device from a current connection point, and the last step, represented by block 312, is to connect the mobile device to the determined offload alternative connection point.

Referring now to FIG. 4, a diagram illustrates optional sub-steps for determining an offload alternative connection point according to embodiments of the invention, which was discussed above with reference to block 308 in FIG. 3. The first sub-step, represented by block 402, is to determine that the mobile device has entered an overlap zone whereby a first geographic area associated with a current connection point overlaps a second geographic area associated with a prospective offload alternative connection point. This determination may trigger the mobile device and/or the base station to make a determination regarding whether to transfer the connection from the current connection point to the prospective offload alternative connection point (thus changing it from prospective to a determined offload alternative connection point).

In some embodiments, as represented by block 404, the base station and/or the mobile device may predict, based on the location, current speed and/or current direction of movement of the mobile device, whether the mobile device will enter a geographic area associated with the prospective offload alternative connection point within a predetermined period of time. As with block 402, this prediction may trigger the mobile device and/or base station to make a determination regarding whether to transfer the connection from the current connection point to the prospective offload alternative connection point (thus changing it from prospective to a determined offload alternative connection point). In some cases, as discussed below, when the prediction that the mobile device will enter the geographic area is made, this triggers a determination of whether the prospective connection point is appropriate for the mobile device to connect. This determination may be based on how long the mobile device is predicted to be within the geographic area corresponding to the prospective connection point, a comparison of the relative strengths of the current connection point versus the prospective connection point and/or the like.

In some embodiments, as represented by block 406, the base station and/or the mobile device may predict, based on the location, current speed and/or current direction of movement of the mobile device, whether the mobile device will remain in a geographic area associated with the prospective offload alternative connection point for a predetermined period of time. If so, then the mobile device and/or base station may then connect the mobile device via the prospective connection point as the connection point is deemed appropriate for the mobile device.

Referring now to FIG. 5, a flowchart illustrates a method 500 for minimizing data overhead in a cellular network according to embodiments of the invention. The first step, represented by block 502, is to determine, based on the speed of the mobile device, that the mobile device is traveling at a speed greater than a speed predetermined threshold. If so, as represented by block 504, a determination may be made that the mobile device should not be connected to a connection point having an associated geographic area less than an area predetermined threshold. Next, represented by block 506, a determination may be made that the prospective offload alternative connection point is not one of the connection points having an associated geographic area less than the area predetermined threshold. In this scenario, the determination results in determining that the mobile device may connect to the prospective connection point because the prospective connection point has a large enough signal strength.

Alternatively, after determining that the mobile device is traveling over the speed threshold (see 502), it may be determined that the mobile device is currently connected to a connection point having a geographic area less than a micro-geographic threshold, as represented by block 508. In such a case, it may be desirable for the mobile device to find a cell with a greater signal strength. As represented by block 510, the next step is to determine that a prospective offload alternative connection point has an associated geographic area greater than a macro-geographic area threshold. In such a scenario, the mobile device may then connect with the alternative connection point.

Referring now to FIG. 6, a diagram illustrates optional sub-steps for determining an offload alternative connection point according to embodiments of the invention, which was discussed above with reference to block 308 in FIG. 3. The first sub-step, represented by block 602, is to build a connection point map. The connection point map includes a plurality of geographic areas each associated with at least one connection point, such as a network base station or wireless access point. The build may be based in part on historical data corresponding to geographic areas associated with connection point and data overhead associated with the same connection points.

The next sub-step, represented by block 604, is to access the connection point map in order to determine the offload alternative connection point, as represented by block 606. The alternative connection point may be determined based on the relative sizes of the geographic areas of any prospective connection points and may also be based on the location information associated with the mobile device such as current location, speed and direction. For example, the mobile device may be traveling toward a geographic area defined by the connection point map and the base station and/or mobile device may determine whether it is appropriate for the mobile device to re-connect with the prospective connection point such as by one or more of the methods discussed herein (e.g., based on an analysis of the signal strength of the prospective connection point, the expected time the mobile device will have access to the connection point and/or otherwise).

In some embodiments, the system (e.g., the base station) calls for an offload or reconnection of a mobile device to another connection point. This may be due to the system experiencing a limited capacity. The mobile device may receive such a request and then begin searching for alternative connection points. First, as discussed above, the mobile device may check its speed based on its location information. If its speed is below a threshold, it may not initiate a process for finding a new connection point, but rather, may remain connected to the current connection point. However, if its speed is above a threshold, it may initiate the process for finding a new connection point. The mobile device may identify one or more prospective alternative connection points and then may determine the signal strength (also known as size or geographic area) of the prospective alternative connection points. If the size of the prospective connection point is too small, then the mobile device will remain connected to a macro cell connection point. However, if the size of the prospective connection point is large enough, then the mobile device may handover its connection to the prospective connection point.

In other embodiments, the mobile device may determine itself that the signal strength of its connection point has fallen below a threshold. The mobile device may then, similar to above, check its speed from its location information and determine the size of prospective connection points. For any prospective connection point that has a signal strength greater than the signal strength of the current connection point, the mobile device determines if the prospective connection point is a micro cell. If the prospective connection point is a micro cell, then the mobile device may remain connected to the macro cell. However, if the prospective connection point is not a micro cell, then the mobile device may handover its connection to the prospective connection point.

In some embodiments, a connection point may identify itself with a size or strength indication to mobile device and/or the network at large. Thus, a mobile device that does not have a connection point map with information on the specific connection point may receive information from the CP itself to make a determination regarding handover.

Referring now to FIG. 7, a flowchart illustrates a method 700 for minimizing control signaling load by reducing probability for handovers in a cellular network according to embodiments of the invention. In most current commercial cellular networks, the terminals or mobile devices are only in control of cell selection when they are in an idle mode (as opposed to a connected mode). If the mobile device is in a connected mode, then typically the network base station determines cell selection such as by using handover commands. However, when the mobile device is in an idle mode, and determines that a data traffic session is imminent, then the mobile device may perform an intelligent cell selection using embodiments of this invention, such as by using mobility vector information and collected network topography information into account. By the mobile device in idle mode performing such an intelligent cell selection, control signaling load may be reduced, thereby reducing probability for subsequent handovers.

The first step of method 700, as represented by block 702, is determining, by a mobile device, that a data traffic session over the cellular network will be initiated by the mobile device within a predetermined time period. The next step, represented by block 704, is to determine, using the mobile device, that the mobile device is in an idle moved with the cellular network. This typically indicates that the mobile device should handle any cell selection because the mobile device is not currently connected to a connection point such as a network base station that would handle or assist in handover/offload in cases of a mobile device in connected mode.

The next step, represented by block 706, is, in response to determining that the data traffic session will be initiated, and also in response to determining that the mobile device in an idle mode, determining, using the mobile device, the location information. In various embodiments, the location information includes location data indicating a current location of the mobile device, speed data indicating a current speed of the mobile device and/or movement data indicating a current direction of movement of the mobile device.

The next step, represented by block 708, is to determine, by the mobile device, a potential connection point based at least in part on the determined location of the mobile device. The potential connection point, in most embodiments, is a connection point that has a geographic signal strength overlapping the current location of the mobile device. In some embodiments, the mobile device is aware of the overlap based at least in part on collected network topology information that may be compiled in the form of a network cell map as discussed above.

FIGS. 8A and 8B are flowcharts illustrating methods 800A and 800B, respectively, that include optional steps for minimizing control signaling load by reducing probability for handovers in a cellular network according to embodiments of the invention. Referring specifically to FIG. 8A, a first step represented by block 802 is to determine, that the potential connection point has limited capacity or has a weak signal strength. This determination may be based on receiving a request from the cellular network for the mobile device to offload from the potential connection point to a second potential connection point as represented by block 804. Thus, in some instances, the mobile device may be considering a connection to the potential connection point and this instruction from the network prompts the mobile device to look for alternative connection point(s); or, in other instances, the mobile device may already be connected to the "potential" connection point and the instruction from the network prompts the mobile device to look for alternative connection point(s).

The next step, represented by block 806, is to determine, based on the speed of the mobile device, that the mobile device is traveling at a speed greater than a speed predetermined threshold. The next step, represented by block 808, is to determine, based on the speed being greater than the speed predetermined threshold, that the mobile device should not be connected to a connection point having an associated geographic area less than an area predetermined threshold. The next and final step, is to determine that the second potential connection point does not have an associated geographic area less than the area predetermined threshold, as represented by block 810. Thus, the mobile device may connect with the second potential connection point. If it is determined the associated geographic area is too small, then the mobile device may continue to look for another qualifying potential connection point (in the case where it is idle) or (in the case where it is connected already) to remain connected to a current connection point.

Referring specifically to FIG. 8B, the first step, similar to FIG. 8A, is to determine that the potential connection point has limited capacity or has a weak signal strength. This may be done, as represented by block 814, by determining that a signal strength being received from the potential connection point falls below a predetermined signal strength threshold. The next step, represented by block 816, is to determine, based on the speed of the mobile device, that the mobile device is traveling at a speed greater than a speed predetermined threshold. The next step, represented by block 818, is to determine that the mobile device is currently connected to a current connection point having a geographic area less than a micro-geographic threshold. The next and final step, represented by block 820, is to determine that the potential connection point has an associated geographic area greater than a macro-geographic area threshold.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A method for minimizing control signaling load by reducing probability for handovers in a cellular network, the method comprising:
   determining, by a mobile device, that a data traffic session over the cellular network will be initiated by the mobile device within a predetermined period of time;
   determining, by the mobile device, that the mobile device is in an idle mode with the cellular network;
   in response to determining that the data traffic session will be initiated and the mobile device is in the idle mode, determining, by the mobile device, location information including location data indicating a current location of the mobile device; and
   determining, by the mobile device, at least one potential connection point based at least in part on the determined location of the mobile device.

2. The method of claim 1, wherein determining the potential connection point comprises:
   accessing a connection point map including a plurality of geographic areas each associated with at least one network base station or at least one access point; and
   determining, based on the plurality of geographic areas of the connection point map, the at least one potential connection point.

3. The method of claim 1,
   wherein the location information comprises a velocity vector comprising current location data indicating the location of the mobile device, speed data indicating a current speed of the mobile device and movement direction data indicating a current direction of movement of the mobile device; and
   wherein determining at least one potential connection point comprises determining based on the current location data, the current speed and the current direction of movement of the mobile device.

4. The method of claim 3, wherein determining the potential connection point comprises:
   accessing a connection point map including a plurality of geographic areas each associated with at least one network base station or at least one access point; and
   determining, based on the velocity vector of the mobile device and the plurality of geographic areas, which of the at least one network base stations or at least one access points, if connected to the mobile device, would minimize a handover probability for the session to be initiated, thereby indicating the at least one potential connection point.

5. The method of claim 4, further comprising:
   monitoring, using the mobile device, a network base station signal level;
   determining, using the mobile device, that the network base station signal level has fallen below a signal level predetermined threshold; and
   listening, using the mobile device, for any alternative connection points within range of the mobile device.

6. The method of claim 5, further comprising:
   recognizing at least one alternative connection point within range of the mobile device;
   accessing the connection point map to determine geographic areas associated with the at least one alternative connection point; and
   determining, based on the velocity vector of the mobile device, the potential connection point from the at least one alternative connection point.

7. The method of claim 1, further comprising:
   initiating connecting the mobile device to the potential connection point.

8. The method of claim 1, further comprising:
   building, based at least in part on historical data gathered by the mobile device and corresponding to geographic areas associated with connection points and data overhead associated with the connection points, a connection point map including a plurality of geographic areas each associated with at least one network base station or at least one access point, including velocity information comprising speed and direction information associated with at least one network base station or at least one access point, the velocity information indicating that the associated at least one network base station or at least one access point should be considered as potential connection points for mobile devices having specified speeds and directions.

9. The method of claim 8, further comprising:
   receiving and storing user input indicating:
      a user negative preference selecting at least one of the connection points, the user negative preference indicating that the mobile device should not connect with the at least one selected connection point regardless of a size of its associated geographic area in the event the mobile device has a velocity vector falling within predetermined negative velocity parameters;
      a user positive preference selecting at least one of the connection points, the user positive preference indicating that the mobile device should consider as the potential connection point the selected at least one connection point regardless of a size of its associated geographic area in the event the mobile has a velocity vector falling within predetermined positive velocity parameters.

10. A mobile device comprising:
   a memory;
   a processor; and
   a module stored in the memory for minimizing control signaling load by reducing probability for handovers in a cellular network, executable by the processor, and configured to:
      determine that a data traffic session over the cellular network will be initiated by the mobile device within a predetermined period of time;
      determine that the mobile device is in an idle mode with the cellular network;

in response to determining that the data traffic session will be initiated and the mobile device is in the idle mode, determine location information including location data indicating a current location of the mobile device; and determine a potential connection point based at least in part on the determined location of the mobile device.

11. The mobile device of claim 10, wherein the location information comprises a velocity vector comprising current location data indicating the location of the mobile device, speed data indicating a current speed of the mobile device and movement direction data indicating a current direction of movement of the mobile device; and wherein determining a potential connection point comprises determining based on the current location data, the current speed and the current direction of movement of the mobile device.

12. The mobile device of claim 11, wherein determining the potential connection point comprises:

accessing a connection point map including a plurality of geographic areas each associated with at least one network base station or at least one access point; and determining, based on the velocity vector of the mobile device and the plurality of geographic areas, which of the at least one network base stations or at least one access points, if connected to the mobile device, would minimize a handover probability for the session to be initiated, thereby indicating the potential connection point.

13. The mobile device of claim 12, wherein the module is further configured to:

monitor a network base station signal level;

determine that the network base station signal level has fallen below a signal level predetermined threshold; and listen for any alternative connection points within range of the mobile device.

14. The mobile device of claim 13, wherein the module is further configured to:

recognize at least one alternative connection point within range of the mobile device;

access the connection point map to determine geographic areas associated with the at least one alternative connection point; and determine, based on the velocity vector of the mobile device, the potential connection point from the at least one alternative connection point.

15. The mobile device of claim 10, wherein the module is further configured to:

initiate connecting the mobile device to the potential connection point.

16. The mobile device of claim 10, wherein the module is further configured to:

build, based at least in part on historical data gathered by the mobile device and corresponding to geographic areas associated with connection points and data overhead associated with the connection points, a connection point map including a plurality of geographic areas each associated with at least one network base station or at least one access point.

17. The mobile device of claim 10, wherein determining the potential connection point comprises:

accessing a connection point map including a plurality of geographic areas each associated with at least one network base station or at least one access point; and determining, based on the plurality of geographic areas of the connection point map, the at least one potential connection point.

18. The mobile device of claim 14, wherein determining the potential connection point further comprises:

determining that the mobile device has a current speed greater than a predetermined speed threshold;

in response to determining the current speed is greater than the predetermined speed threshold and in response to determining that the network base station signal level is lower than the signal level predetermined threshold, determining that a geographic area associated with one of the alternative connection points is less than a minimum predetermined geographic area threshold; and eliminating the alternative connection point from consideration as the potential connection point.

19. The mobile device of claim 14, wherein the module is further configured to:

determining that the mobile device has a current speed greater than a predetermined speed threshold;

in response to determining the current speed is greater than the predetermined speed threshold and in response to determining that the network base station signal level is lower than the signal level predetermined threshold, determining a projected path of travel of the mobile device based on the velocity vector;

determining, using the mobile device, that one of the alternative connection points has a projected geographic area of relevance, based on the projected path of travel, that is less than a minimum predetermined threshold; and eliminating the alternative connection point from consideration as the potential connection point.

20. The mobile device of claim 14, wherein determining the potential connection point further comprises:

determining that the mobile device has a current speed greater than a predetermined speed threshold;

in response to determining the current speed is greater than the predetermined speed threshold and in response to determining that the network base station signal level is lower than the signal level predetermined threshold, determining a projected path of travel of the mobile device based on the velocity vector;

determining, based on the projected path of travel, that the mobile device is exiting the geographic area associated with the alternative connection point; and eliminating the alternative connection point from consideration as the potential connection point.

21. A computer program product for minimizing control signaling load by reducing probability for handovers in a cellular network, the computer program product comprising:

a non-transitory computer-readable medium comprising a set of codes for causing a computer to:

determine that a data traffic session over the cellular network will be initiated by the mobile device within a predetermined period of time;

determine that the mobile device is in an idle mode with the cellular network;

in response to determining that the data traffic session will be initiated and the mobile device is in the idle mode, determine location information including location data indicating a current location of the mobile device; and determine a potential connection point based at least in part on the determined location of the mobile device.

\* \* \* \* \*